UNITED STATES PATENT OFFICE.

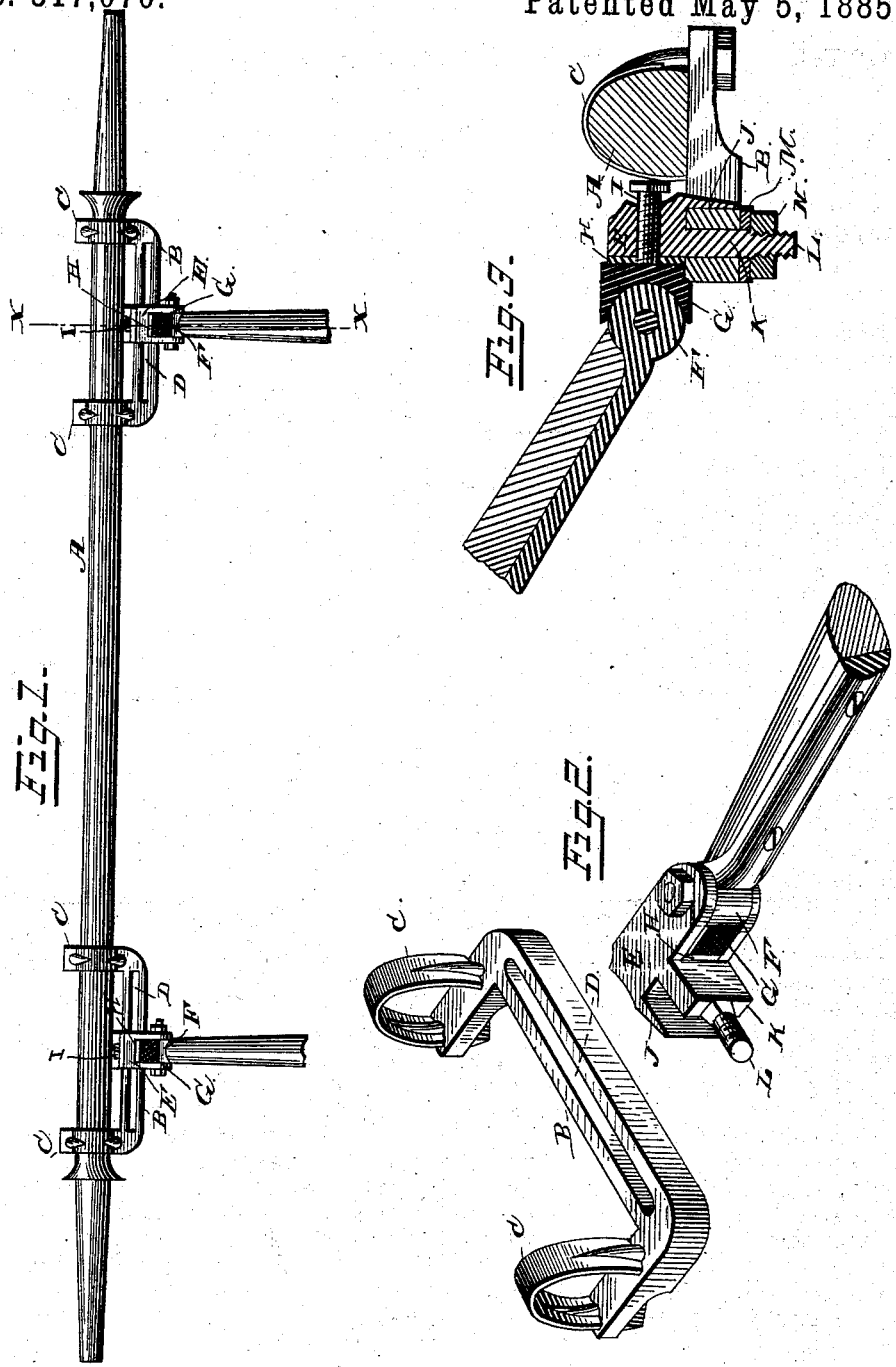

CHRISTOPHER C. WRIGHT, OF ELKTON, MARYLAND, ASSIGNOR OF ONE-HALF TO PALMER C. STRICLAND, OF SAME PLACE.

THILL-COUPLING.

SPECIFICATION forming part of Letters Patent No. 317,070, dated May 5, 1885.

Application filed January 8, 1885. (No model.)

*To all whom it may concern:*

Be it known that I, CHRISTOPHER C. WRIGHT, a citizen of the United States, residing at Elkton, in the county of Cecil and State of Maryland, have invented a new and useful Improvement in Thill-Couplings, of which the following is a specification, reference being had to the accompanying drawings.

This invention relates to thill-couplings; and it has for its object to provide improved means for attaching the thills or shafts to the axle, whereby when one of the shafts or thills becomes broken or worthless it can be readily detached without separating the clips from the axle and replaced by a new one, so as to avoid scarring or otherwise defacing the paint or surface of the vehicle.

A further object of the invention is to provide means for adjusting or shifting the shafts or thills laterally to suit various circumstances, and without removing the clips from the axle; and a still further object is to enable a strong and efficient attachment for the shafts or thills and produce a superior coupling, applicable to all classes of vehicles, which shall possess numerous advantages in point of simplicity, durability, convenience, and general utility over those in common use.

With these ends in view the said invention consists in certain details of construction and combination of parts, as hereinafter set forth, and particularly pointed out in the claim.

In the accompanying drawings, Figure 1 is a plan or top view of an axle showing my improved adjustable coupling for connecting the shafts or thills thereto, Fig. 2 is a perspective view of one shaft with its coupling detached from the axle and the parts separated. Fig. 3 is a longitudinal section, enlarged, on the line *x x*, Fig. 1.

Like letters are used to designate corresponding parts in the several figures.

Referring to the drawings, A designates the axle of a carriage, wagon, or other vehicle to which my improved coupling is attached, so as to connect the shafts or thills thereto. Since the couplings for connecting each shaft or thill are alike in every respect, (see Fig. 1,) it will be necessary to describe only one of them, and refer by the same letters to the corresponding parts of the other.

B designates a U-shaped plate having its arms or ends attached by two clips, C C, to the under side of the axle, and provided with a long transverse slot, D, which extends from one arm or end to the other. The slotted main portion of the plate B projects a sufficient distance forward of the axle to allow the attachment of the shafts or thills with ease, and also to permit the adjusting-screw to be turned to accommodate the wear on the cushion.

E designates the draw-irons formed with forwardly-extending arms, in the space between which is secured, by a bolt-and-nut connection, the eye or trunnion of the thill-iron F, secured to the thill or shaft in the usual manner.

In the space between the arms or the draw-irons, in rear of the eye or trunnion of the thill-iron, is located a rubber cushion, G, shaped substantially as shown, and in rear of the cushion, and bearing against the same, is a flat rectangular plate, H, to which is connected an adjusting-screw, I, passing rearwardly in a longitudinal line through the back wall of the draw-irons and extending beyond the same, its end or head being squared so as to be turned by a wrench, or nicked, like an ordinary screw-head, as may be found desirable; but I prefer the construction shown. It will be understood that by turning the screw I the plate H is forced inward or forward against the rubber cushion G, to cause the latter to press against the trunnion or eye with an increased pressure, and this pressure may be increased or diminished at pleasure to accommodate the wear on the cushion. The rear end of the draw-iron E is provided with a depending flange, J, to slide or catch over the rear face of the plate B, and forward of this flange the draw-iron is formed with a depending oblong projection, K, which slides in the slot D, and has a downwardly-extending diminished screw-threaded body, L, which performs the function of a bolt to receive the nut and washer M N.

It will be observed (see Fig. 3) that the threaded body or bolt L projects below the plate B, so as to permit the working of the nut upward against the under side of the said plate, to bind the draw-iron at any point thereon. It will also be seen that the projection K slides in the slot of the plate B, and the portion of the plate in rear of the slot is received in the space between the projection and the flange J, the latter sliding over the rear face of the plate, and thus permitting the lateral sliding movement of the draw-irons, guiding them in their movements, obviating all tendency of displacement, and providing a firm connection of the parts.

The operation of my invention will be readily understood from the foregoing description, taken in connection with the annexed drawings. Should it be desired to detach either one or both of the shafts for the purpose of renewal, this is effected by unscrewing the nut and washer M N and raising the draw-irons out of the slot in the plate B. Then by loosening the bolt and nut connecting the thill-iron to the draw-irons the thills or shafts are detached. It will be seen that I do not touch the clips encircling the axle and securing the plate B thereto, for this is unnecessary by my improvement. These plates B may remain in place until broken, and by this means scarring, defacing, or disfiguring of the paint or surface of the axle and other parts of the vehicle are entirely obviated, and the attachment of the shafts or thill is made capable of ready detachment for the purpose stated. In the present form of couplings, when a shaft is broken, it is necessary to loosen the clip which encircles the axle before the shaft can be removed, and this procedure is not only injurious to the paint of the vehicle, but the clip can never be secured in place as tight as originally. Furthermore, since the width between the shafts vary according to the will of the maker, it is often found necessary to shift the shafts a slight distance, one or two inches, (more or less,) for various purposes—as, for instance, to accommodate the difference in the sizes of horses and the like; but by the present arrangement this cannot be done except by shifting the clips, and this procedure has been found objectionable, as before stated. In my arrangement the nut M can be loosened to allow the shifting of the draw-irons through the slot of the plate B to any point thereon, (the limits being from one-sixteenth of an inch to six inches,) the nut being tightened to hold the draw-irons at the point desired. It will also be seen that by providing two clips for attaching the plate B to the axle the connection is made secure in every respect, although I do not wish to be confined to the particular number of clips for that purpose.

It will be understood that various modifications in the details of construction may be resorted to without departing from the spirit or scope of the present invention.

My improved thill-coupling is applicable to all classes of vehicles, can be manufactured cheaply, is simple and durable in construction, and will prove of great utility for the purposes intended.

Having described my invention, I claim—

In a thill-coupling, the combination, with the axle having a slotted plate secured thereto, of the draw-iron carrying the thill, and provided with a guide-flange to catch around the face of the slotted plate, and a depending projection to work in the slot, and means, substantially as described, for holding the projection at any point of the length of said plate, as set forth.

In testimony that I claim the foregoing as my own I have hereto affixed my signature in presence of two witnesses.

CHRISTOPHER C. WRIGHT.

Witnesses:
JOSEPH B. PIERSON,
GEORGE A. BROWN.